Aug. 24, 1954  W. L. FRY  2,687,483
WINDINGS FOR DYNAMOELECTRIC MACHINES
Filed Aug. 18, 1952

Inventor
W. L. Fry

Patented Aug. 24, 1954

2,687,483

UNITED STATES PATENT OFFICE 2,687,483

WINDINGS FOR DYNAMOELECTRIC MACHINES

William Lawrence Fry, Birmingham, England, assignor to Joseph Lucas (Industries) Limited, Birmingham, England Application August 18, 1952, Serial No. 304,917

Claims priority, application Great Britain August 27, 1951

1 Claim. (Cl. 310—194)

In known types of dynamo-electric machines (generators or motors) having windings mounted on salient poles around the interior of the stator, the windings are interconnected alternately. The associated windings are so made as to leave between them lengths of connecting wire of sufficient length to bridge the distance between a given pole and the next alternate pole.

Hitherto difficulty has been experienced, in some forms of small machines, in satisfactorily accommodating and securing the lengths of connecting wire between the windings, and the object of the present invention is to enable this difficulty to be overcome in a simple manner.

The invention comprises a bobbin adapted to carry a winding and also adapted for the attachment thereto of a length of connecting wire extending from the winding of an adjacent bobbin.

Figure 1:
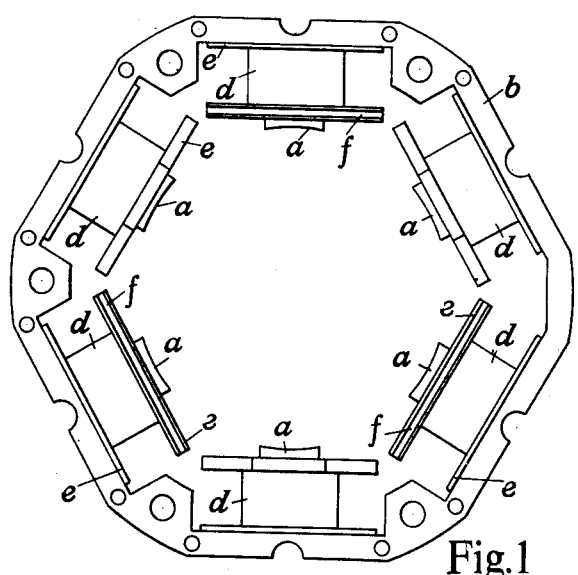
Figure 1 illustrates one arrangement of pole pieces and windings for which the invention is required.
Figure 3:
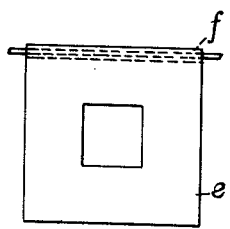
Figure 3 is a front elevation and Figure 4 a side elevation of a bobbin constructed in accordance with the invention.
Figure 4:
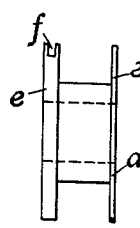

In the application of the invention to a small A. C. generator having six salient pole pieces $a$ around the inner side of its stator $b$ as shown in Figure 1, each winding $c$ is mounted on a flanged bobbin $d$ adapted to be placed on a pole piece. The six windings are divided into two groups each containing three windings, and the windings of one set are arranged alternately between those of the other set. In the example shown, each bobbin has end flanges $e$ of rectangular form. One of the flanges of each bobbin has formed in one of its edges or in an end face a groove $f$ adapted to receive a part of the length of wire extending between the windings on the adjacent bobbins.

Figure 2:
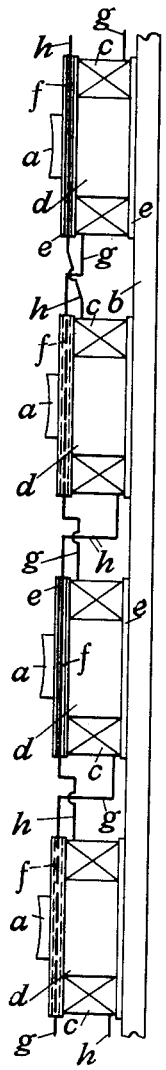
Figure 2 is a diagrammatic view illustrating the mode of interconnecting the windings on alternate pole pieces.

When mounting the wound bobbins in position on the pole pieces they are arranged so that the grooves of one alternate set are situated at one side of the stator, and the others are arranged with their grooves at the opposite side. Looking at Figure 2, and starting at the upper end, the connecting wire $g$ forms part of or is attached to the adjacent winding. On leaving this winding the wire is placed in the groove of the next bobbin, and thence it passes to the winding of the third bobbin in Figure 2, and so on. The wire $h$ at the upper end of the drawing is placed along the groove of the first bobbin and thence it passes to the winding of the second bobbin. From the latter it passes along the groove of the third bobbin, and so on. The connections of the windings to an external cable are made in the usual manner (not shown).

The securing of the connecting wires in the grooves may be effected by inserts which are themselves secured by an adhesive, or the edges of the grooves may be closed over the wires and sealed by an adhesive, or the wires may be secured solely by an adhesive. But preferably the bobbins are made from thermoplastic material and the edge parts of the groove are united by heat.

By this invention the lengths of wires extending between alternate windings can be accommodated and secured against undesired movement in a very simple and convenient manner.

Having thus described my invention what I claim as new and desire to secure by Letters Patent is:

A dynamo-electric machine stator having a plurality of salient poles around its interior, bobbins on the salient poles, windings on the bobbins, and lengths of wire uniting the windings on alternate bobbins, each bobbin having an end flange formed with a groove which accommodates a part of the wire uniting the two windings at opposite sides of the bobbin.

References Cited in the file of this patent

UNITED STATES PATENTS

| Number | Name | Date |
|---|---|---|
| 956,553 | Webster et al. | May 3, 1910 |
| 2,412,254 | Edelman | Dec. 10, 1946 |

FOREIGN PATENTS

| Number | Country | Date |
|---|---|---|
| 181,893 | Switzerland | Apr. 1, 1936 |